United States Patent [19]

Kawabe

[11] Patent Number: 4,719,570
[45] Date of Patent: Jan. 12, 1988

[54] APPARATUS FOR PREFETCHING INSTRUCTIONS

[75] Inventor: Shun Kawabe, Hadano, Japan

[73] Assignee: Hitachi, Ltd., Tokyo, Japan

[21] Appl. No.: 597,744

[22] Filed: Apr. 6, 1984

Related U.S. Application Data

[63] Continuation of Ser. No. 238,985, Feb. 27, 1981, abandoned.

[30] Foreign Application Priority Data

Feb. 29, 1980 [JP] Japan ................... 55-24749

[51] Int. Cl.$^4$ .............................................. G06F 9/26
[52] U.S. Cl. .................................................. 364/200
[58] Field of Search ... 364/200 MS File, 900 MS File

[56] References Cited

U.S. PATENT DOCUMENTS

| 3,292,153 | 12/1966 | Barton et al. | 364/200 |
|---|---|---|---|
| 3,401,376 | 9/1968 | Barnes et al. | 364/200 |
| 3,553,655 | 1/1971 | Anderson et al. | 364/200 |
| 3,559,183 | 2/1968 | Sussenguth | 364/200 |
| 3,573,853 | 4/1971 | Watson et al. | 364/200 |
| 3,577,189 | 5/1971 | Cocke et al. | 364/200 |
| 3,764,988 | 10/1973 | Onishi | 364/200 |
| 3,896,419 | 7/1975 | Lange et al. | 364/200 |
| 3,898,624 | 8/1975 | Tobias | 364/200 |
| 3,940,741 | 2/1976 | Horikoshi et al. | 364/200 |
| 4,040,031 | 8/1977 | Cassonnet | 364/200 |
| 4,110,822 | 8/1978 | Porter et al. | 364/200 |
| 4,125,870 | 11/1978 | Suzuki et al. | 364/900 |
| 4,157,587 | 6/1979 | Joyce et al. | 364/200 |
| 4,200,927 | 4/1980 | Hughes et al. | 364/200 |
| 4,210,960 | 7/1980 | Borgerson et al. | 364/200 |
| 4,338,661 | 7/1982 | Tredennick et al. | 364/200 |
| 4,373,180 | 2/1983 | Linde | 364/200 |

FOREIGN PATENT DOCUMENTS 51-40824 4/1976 Japan .

OTHER PUBLICATIONS

Ramamoorthy, C. V., "Pipeline Architecture," ACM Computing Surveys, vol. 9, No. 1, 1977 pp. 61-102.

Primary Examiner—Thomas M. Heckler
Assistant Examiner—Jonathan C. Fairbanks
Attorney, Agent, or Firm—Antonelli, Terry & Wands

[57] ABSTRACT

An information processing system having a high speed buffer storage and employing an advanced control includes an address stack for storing addresses to be sent to a main storage as readout requests when instruction words or data are not contained in the high speed buffer storage, together with instruction stream numbers and flags for indicating whether the readout requests are conditional requests based on predicted prefetching. For the addresses having the conditional request flags, they are sent as the readout requests when the prediction is finally determined and the other addresses are cancelled. In this manner, the advanced control need not be interrupted.

6 Claims, 5 Drawing Figures

APPARATUS FOR PREFETCHING INSTRUCTIONS

This is a continuation of application Ser. No. 238,985 filed Feb. 27, 1981, now abandoned.

BACKGROUND OF THE INVENTION

1. Field of the Invention

The present invention relates to an information processing system for processing data and instruction words, and more particularly to an information processing system which employs a high speed buffer storage and an advanced control technique.

2. Decsription of the Prior Art

As is well known, in an information processing system, particularly of large scale, the adoption of a high speed buffer storage for storing copies of data and instruction words in a main storage and the adoption of prefetch of the instructions and data are commonly used in order to enhance the processing speed. Through these techniques, the data and instruction words required in the processing are prefetched to the high speed buffer storage to enable high speed processing. However, when an instruction stream to be processed is changed by a branch instruction, the instruction words and data which are not necessary for the processing would have been prefetched in the high speed buffer storage. This is a particular problem in an information processing system having a high degree of advanced control such as in a pipeline control system. The outline of the pipeline control system and problems thereof are discussed in an article "Pipeline Architecture" by C. V. Ramamoorthy in ACM Computing Surveys, Vol. 9, No. 1, pp 61-102, Copyright 1977, Association for Computing Machinery Inc. In such an information processing system, controls are made even before a determination of a conditional branch instruction. Namely, some of the instructions and data necessary for processing both instruction streams following after the conditional branch instruction are read out of the high-speed buffer storage and sent to an instruction control unit and an arithmetic unit, respectively. Those units, however, only hold the instructions and the data until a result of the determination for the condition is made. After the result, instructions or data only corresponding to either instruction stream decided to be executed are executed or processed.

If the high-speed buffer storage does not have the instructions or the data necessary for the above instruction streams following after the conditional branch instruction, they will be read out of the main memory and transferred to the high-speed buffer storage. In this case, after the result of the determination of the conditional branch instruction, the instructions and the data for instruction streams decided not to be executed are unnecessary. Similarly, the above transfer of these unnecessary instructions and data is also unnecessary. This causes therefore a reduction of the probability of necessary instruction words and data in the buffer storage and may result in loss of instruction words and data to be used in the next step from the buffer storage.

In order to resolve the above problem, it has been proposed to suppress the initiation of the transfer stage for the instruction words and data from the main storage to the high speed buffer storage upon decoding of the branch instruction until the determination of the branch instruction, and it is determined whether the transfer stage for the main storage should be initiated or not. See Japanese Patent Application Kokai (Laid Open) No. 40824/76. In this system, fetching of unnecessary instructions words and data into the high speed buffer storage, that is, the initiation of the data transfer stage of unnecessary information from the main storage to the high speed buffer storage, is prevented. However, in this system, the advanced control for the instruction streams following the conditional branch instruction must pause until the result of the determination if the buffer storage does not have the data and/or instruction words.

SUMMARY OF THE INVENTION

The present invention is intended to resolve the disadvantages encountered in the prior art system and it is an object of the present invention to provide an information processing system which prevents unnecessary information transfer from the main storage to the high speed buffer storage without loosing the advantage of the advanced control and transfers of only the necessary information.

According to an aspect of the present invention, if the instruction words or data are not contained in the high speed buffer storage, an address stack is provided to store addresses to be sent as readout requests to the main storage with instruction numbers and conditional flags for indicating that the readout request is directed to a prefetch for an instruction following after the conditional branch instruction. Thus, if the instruction words or data are not contained in the high speed buffer storage, the prefetch addresses regarding an instruction following after the conditional branch instruction are stored in addresses stacked together with the conditional flags. Accordingly, the advanced control need not pause. The transfer stage for the main storage is immediately initiated for those addresses which have no conditional flag. The transfer stage for those addressed having the conditional flag is not initiated until after the success of the determination. According to the result of the determination, the transfer stage is started for those addresses having the stream number of the stream decided to be executed, while the addresses having a different stream number from the above stream number are cancelled, starting no transfer stage.

An information processing system employing advanced control techniques wherein memory addresses for data and/or instructions related to instruction streams following after a conditional branch instruction are prepared in advance of the result of testing for the condition of the conditional branch instruction includes a main storage for storing the data and/or instructions; a high speed buffer storage coupled to the main storage, the high speed buffer storage having a data part for storing the data and/or instructions read from the main storage and an address part for storing addresses of each of the stored data and/or instructions in said data part; detecting circuitry coupled to the high speed buffer storage and to a source of a read addres of each data and/or instruction, the detecting circuitry detecting whether a read address of each data and/or instructions related to the instruction streams corresponds or does not correspond to one of the addresses in the address part; data reading circuitry coupled to the high speed buffer storage and to the detecting circuitry, the data reading circuitry being responsive to the correspondence output from the detecting circuitry for reading the stored data and/or instructions; address holding circuitry coupled to the detecting circuitry, the address holding circuitry being responsive to the noncorrespondence output from said detecting circuitry for storing the read address using both a stream number and an identification indicating whether the read address relates to an instruction after the conditional branch instruction; stream selection circuitry coupled to the address holding circuitry, the stream selection circuitry being responsive to the result of testing for a condition for selecting an instruction stream to be processed; and address sending circuitry coupled to the stream selection circuitry and to the main storage, the address sending circuitry sending addresses identified by both a specified stream number and an identification from said address holding circuitry to said main storage to read the data and/or instruction therefrom.

DESCRIPTION OF THE PREFERRED EMBODIMENTS

The present invention is now explained in detail with reference to preferred embodiments shown in the accompanying drawings.

Figure 1:
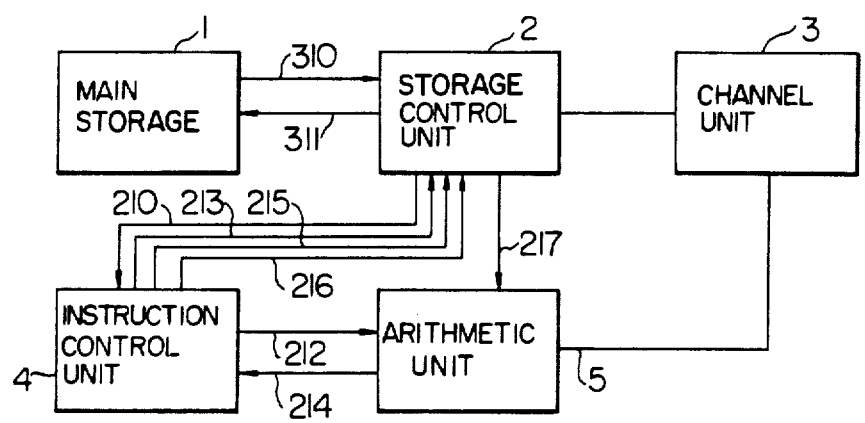
FIG. 1 is a block diagram showing an overall configuration of an information processing system to which the present invention is applied.

FIG. 1 shows an overall configuration of an information processing system to which the present invention is applied and which comprises a main storage 1, a storage control unit 2, a channel unit 3, an instruction control unit 4 and an arithmetic unit 5. In this system, instruction words in the main storage 1 are processed in the following manner. The instruction word is read out of the main storage 1 by the instruction control unit 4 via the storage control unit 2. The instruction word is loaded into the instruction control unit 4 and decoded thereby, and data necessary for the operation specified by the instruction word are also read out of the main storage 1 via the storage control unit 2. The data read out are transferred to the arithmetic unit 5 where they are processed in accordance with the instruction word. The channel unti 3 controls the exchange of data with I/O devices. Since it is not pertinent to the present invention, it will not be discussed herein.

In the information processing system of the present invention which employs advanced control, the readout and decoding of the instruction words, the readout of the data necessary for the instructed operations and the processing of the data in accordance with the instruction words are carried out in an overlapped mode for a multiplicity of instruction words. Thus, the main storage 1, the storage control unit 2, the instruction control unit 4 and the arithmetic unit 5 operate in parallel. The storage control unit 2 includes a high speed buffer storage and if they are not contained in it the control unit 2 initiates a transfer stage for the main storage 1. In the system shown in FIG. 1, the present invention particularly relates to storage control unit 2 and the instruction control unit 4.

Figure 2:
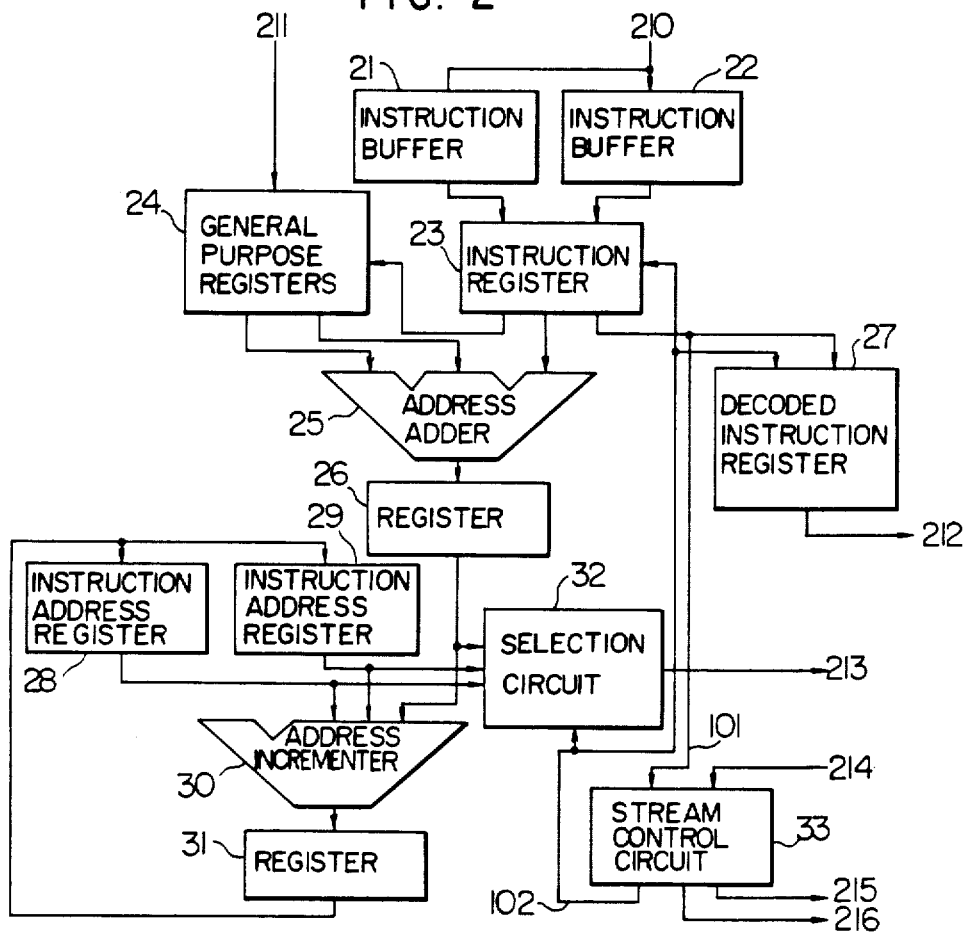
FIG. 2 shows detail of an instruction control unit shown in FIG. 1.

FIG. 2 shows a detailed construction of the instruction control unit 4. In FIG. 2, the instruction work read out of the storage control unit 2 is stored in an instruction buffer 21 or an instruction buffer 22 via a line 210. The two instruction buffers are provided so that one of them is assigned to a target address of a branch instruction while the other is assigned to a main instruction stream. The instruction word from the instruction buffer 21 or 22 is loaded into an instruction register 23 where the instruction word is decoded. The decoded information is loaded into a decoded instruction register 27, then it is transferred to the arithmetic unit 5 via line 212 when the operation is to be carried out. When the instruction work is decoded, a data address is prepared by an address adder 25 and the result is loaded into a register 26. Numeral 24 denotes a stack of general purpose registers. The content of the register 26 is transferred to the storage control unit 2 via a selection circuit 32 so that data is read out. Instruction address registers 28 and 29 allow read out of the instruction word in accordance with the instruction streams to be controlled in advance. The contents thereof are also transferred to the storage control unit 2 via the selection circuit 32 and used to read the instruction word out of the high speed buffer storage. An address thereof is incremented by an address incrementer 30 to produce a readout address for the next instruction word, which is loaded into the instruction address register 28 and 29 via a register 31.

The instruction control unit 4 functions to read out and decode the instruction word and read out the data necessary for processing prior to the execution of the instruction word. In FIG. 2, it includes a stream control circuit 33 to prevent an unnecessary transfer stage from the main storage 1 to the high speed buffer storage being carried out. This is one of the most important features of the present invention.

Figure 3:
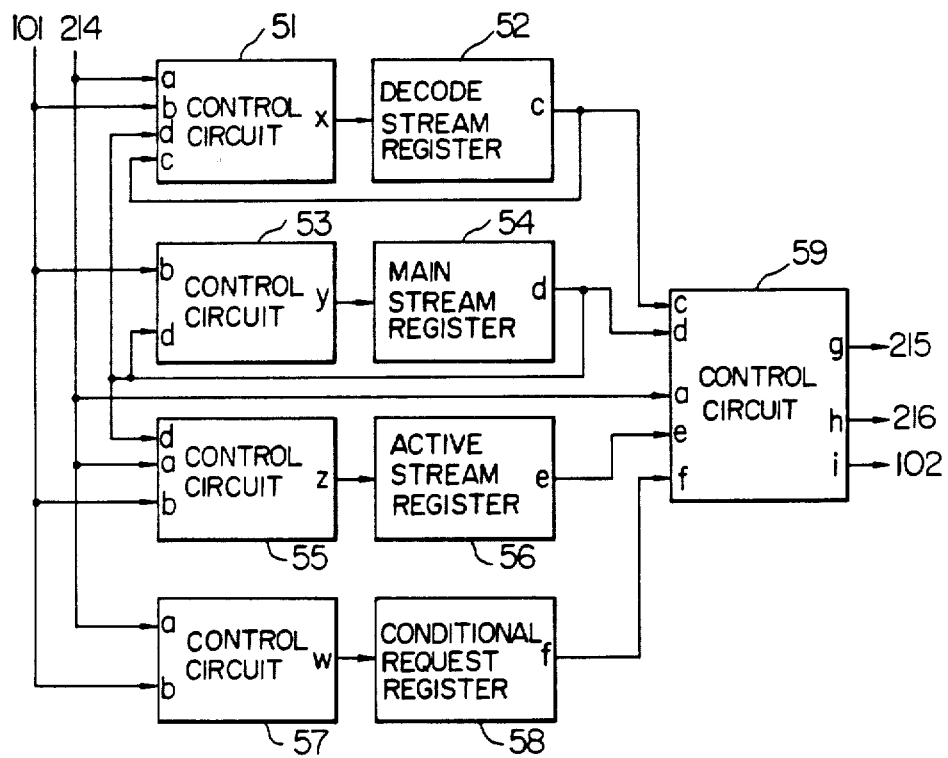
FIG. 3 shows an embodiment of a stream control circuit in the instruction control unit, which is particularly relevant to the present invention.

FIG. 3 shows detail of an embodiment of the stream control circuit 33. In FIG. 3, numeral 58 denotes a conditional request register. When a conditional branch instruction is loaded into the instruction register 23 shown in FIG. 2 and decoded, the register 58 is set by a control circuit 57 via a line 101. When the register 58 is set, a control circuit 59 informs the storage control unit 2 via a line 215 that the prefetch of the instruction words or data is based on the conditional readout request. The conditional request register 58 is reset when the stream control circuit 33 receives the branch/non-branch signal from the basic processing unit 5 via a line 214. Thus, the conditional request register 58 holds "1" after the instruction control unit 4 has decoded the conditional branch instruction and until the branch/non-branch of the branch instruction is determined, and all read requests issued during this period from the instruction control unit 4 to the storage control unit 2 are treated as the conditional requests. Detail of the storage control unit 2 will be discussed hereinafter.

In FIG. 3, a decode stream register 52 indicates a stream number of the instruction stream currently being decoded. The content of the register 52 is transferred to the decoded instruction register 27 shown in FIG. 2 by the control circuit 59 via a line 102, then it is transferred to the arithmetic unit 5 via a line 212 so that it is used to select the instruction stream to be executed when the arithmetic unit 5 determines the branch/non-branch of the branch instruction. The content of the register 52 is also transferred to the selection circuit 32 via the line 102 so that is is used to select the instruction address register 28 or 29. A main stream register 54 indicates a main stream of the instruction streams. An active stream register 56 indicates an active stream of the instruction streams. When there is no conditional branch instruction, one of the instruction streams is active, and during the period from the decoding of the conditional branch instruction to the determination of the branch/non-branch, the main stream as well as the target stream are active. When the result of determination for the branch/non-branch is received from the arithmetic unit 5 via the line 214, only one of the instruction streams is rendered active by the control circuit 55. Simultaneously, the control circuit 59 informs the instruction stream to be executed as a result of the determination for the branch, to the storage control unit 2 via the line 216.

Figures 4, 5:
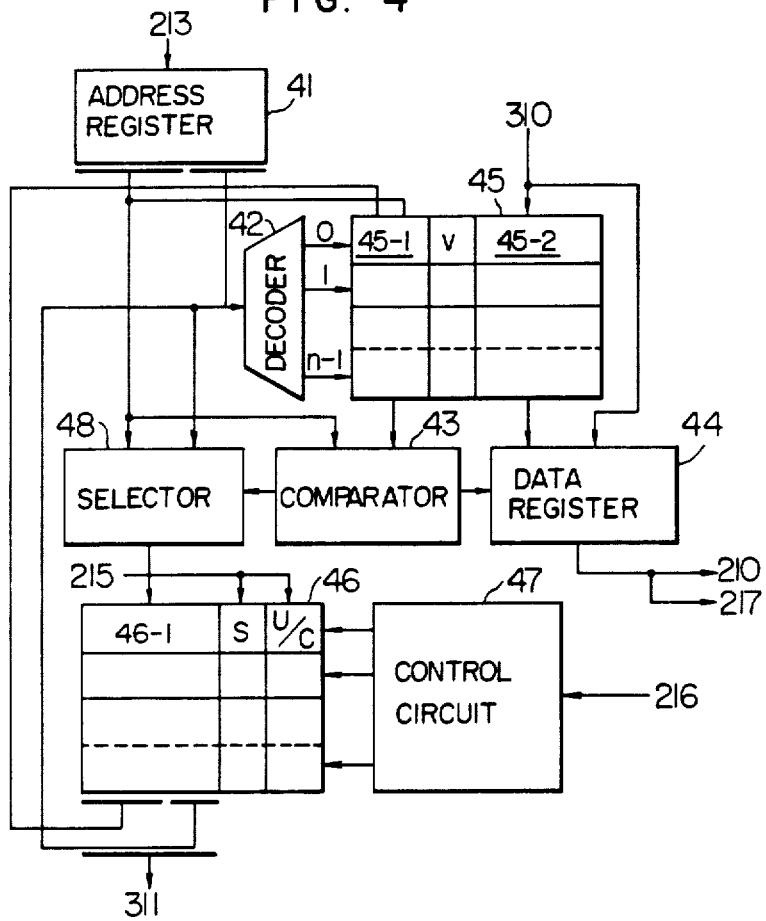
FIG. 4 shows an embodiment of a storage control unit.
FIG. 5 illustrates functions of control circuits shown in FIG. 3.

FIG. 5 illustrates truth tables for the functions of the control circuits 51, 52, 55 and 57, in which (1), (2), (3) and (4) show those of the control circuits 51, 53, 55 and 57, respectively. Only those logical combinations which are important to the operation of the invention have been illustrated. The control circuits 51, 53, 55, 57 and 59 are shown separately in FIG. 3 for the sake of convenience of explanation but they may be integrally constructed in a microprogrammed control circuit to attain a desired function.

FIG. 4 shows a detailed construction of the storage control unit 2. In FIG. 4, an address is loaded into an address register 41 from the instruction control unit 4 via a line 213. Bits at that address are decoded by a decoder 42, which specifies a column in the high speed buffer storage 45. The high speed buffer storage 45 includes a plurality of columns with each column comprising an address registration field 45-1, a data registration field 45-2 and a V-bit field for indicating the validity of the content of the column when the stored V-bit is "1". The address registration field 45-1 of the specified column is compared with the address in the address register 41 by a comparator circuit 43, and when the comparator shows equity, the content of the data registration field 45-2 of the specified column is loaded to a data register 44, then it is transferred to the instruction control unit 4 or the arithmetic unit 5 via a line 210 or 217. The instruction control unit 4 and arithmetic unit 5 will hold the instruction and data until a success of the determination for the condition of the conditional branch instruction and thereafter initiate to execute only the instruction for processing the data relating to the instruction stream decided to be executed. If the comparison in the comparator circuit 43 shows non-equality, that is, if there is not data in the specified column of the buffer storage, the address in the address register 41 is loaded into a field 46-1 of an address stack 46 by a selection circuit 48. Simultaneously, an instruction stream number and information indicating whether it is a conditional request or not is loaded into S (stream) and U (unconditional)/C (conditional) fields of the address stack 46, by the instruction control unit 4 via a line 215. Then, the storage control unit 2 starts to load the next address to the address register 41.

If the address loaded to the address stack 46 is not a conditional request, that is, if it is an unconditional request (U), the address is immediately sent to the main storage 1 via a line 311 as a request. The instruction words or data read out of the main storage 1 are transferred to the field 46-1 by the address stack 46. If the address is a conditional request (C), a request to the main storage 1 is not immediately issued, but the address is sent to the main storage as a result of the following procedures. The result of the determination of the branch instruction is reported to the instruction control unit 4 by the arithmetic unit 5 via a line 214 and the instruction stream to be executed is reported to the storage control unit 2 via a line 216. At this stage of the report, an address which has been assigned with both the number of an instruction stream to be executed and an indication of the conditional request (C) is, if any, sent to the main storage 1 as a request. On the other hand, at this stage of the report, an address which has been assigned with both a number different from the number of an instruction stream to be executed and the indication of the conditional request (C) is, if any, not sent to the main storage 1 and is cancelled.

As is apparent from the above explanation, the above embodiment offer offers the following advantages.

1. By setting the flag of a conditional request to the predicted prefetch request, an unnecessary information transfer stage from the main storage is avoided.

2. Because the unnecessary information transfer stage is avoided, a waiting time of the succeeding request for the transfer stage is eliminated and only the necessary data are stored in the high speed buffer storage.

3. By the provision of the address stack for holding the requests for the main storage each having the instruction stream number and the conditional flag, the prefetching need not be interrupted even after the conditional branch instruction.

What is claimed is:

1. An information processing system employing advanced control techniques comprising: an instruction control and arithmetic unit for preparing data addresses for data and/or instructions related to instruction streams following after a conditional branch instruction in advance of the result of testing for the condition of the conditional branch instruction, said instruction control and arithmetic unit having a plurality of instruction buffers, said instruction buffers holding instructions, said instruction control and arithmetic unit processing an instruction read from one of said instruction buffers corresponding to a specified stream number, supplying a read address of data and/or an instruction accompanying a processing of an instruction, and outputting a result of testing for a condition of a conditional branch instruction;

a main storage for storing data and/or instructions;
a high speed buffer storage coupled to said main storage having
 a data part for storing the data and/or instructions read from the main storage, and
 an address part for storing addresses of each of the stored data and/or instructions in said data part;
detecting means coupled to said high speed buffer storage and to said instruction control and arithmetic unit, said detecting means detecting whether a read address of each data and/or instruction related to the instruction streams corresponds or does not correspond to one of said addresses in said address part and for outputting a correspondence or noncorrespondence output of the detection between said addresses;
data read means coupled to said high-speed buffer storage and to said detecting means, said data read means being responsive to a correspondence output from said detecting means for reading each stored data and/or instruction therefrom;

address holding means coupled to said instruction control and arithmetic unit and to said detecting means, said address holding means being responsive to the non-correspondence output from said detecting means for storing said read address, a stream number and an identification indicating whether said read address relates to an instruction after the conditional branch instruction;

stream selection means coupled to said instruction control and arithmetic unit and to said address holding means, said stream selection means being responsive to the result of a testing of the condition of the conditional branch instruction for selecting an instruction stream to be processed, and address sending means coupled to said stream selection means, said address holding means, and to said main storage, said address sending means sending said read address to said main storage if said identification held in said address holding means indicates no relation to a conditional branch instruction and said address sending means sending addresses identified by both a specified stream number and an identification from said address holding means to said main storage to read each stored data and/or instruction therefrom if said identification held in said address holding means indicates relation to a conditional branch instruction.

2. An information processing system employing advanced control techniques comprising; and instruction control and arithmetic unit for preparing data addresses for data and/or instructions related to instruction streams following after a conditional branch instruction which are prepared in advance of a result of testing for the condition of the conditional branch instruction;

a main storage for storing the data and/or instructions;

a storage control unit coupled to said main storage having a high speed buffer storage, said high speed buffer storage having a data part for storing the data and/or instructions read from the main storage, and an address part for storing addresses of each of the stored data and/or instructions in said data part;

said instruction control and arithmetic unit having a plurality of instruction buffers, said instruction buffers holding instructions, said instruction control and arithmetic unit having processing means for processing an instruction read from one of said instruction buffers corresponding to a specified stream number and for supplying to said storage control unit a read address of a data and/or instruction accompanying a processing of an instruction and outputting a result of testing for a condition of a conditional branch instruction;

said instruction control and arithmetic unit having stream control means responsive to said branch instruction for outputting both an identification whether said read address is related to an instruction following after said conditional instruction and said specified stream number and for outputting a stream number of an instruction stream to be processed in response to said result of testing for a condition of a conditional branch instruction;

said storage control unit further including detecting means coupled to said instruction control and arithmetic unit and said high speed buffer storage for detecting whether said read address corresponds to one of said addresses of said address part or not so as to output a correspondence output or noncorrespondence output;

said storage control unit further including data read means coupled to said detecing means, said high speed buffer storage and said instruction buffers responding to said correspondence output for reading data and/or instruction from said high speed buffer storage to one of said instruction buffers;

said storage control unit further including address holding means coupled to said detecting means and said stream control means and responsive to said noncorrespondence output for storing said read address and said stream number and said identification from said stream control means; and said storage control unit further including address sending means coupled to said stream control means and said address holding means, said address sending means sending said read address to said main storage if said identification held in said address holding means indicates no relation to a conditional branch instruction, said address sending means sending said read address related to said stream number outputted from said stream control means in response to said result of testing if said identification held in said address holding means indicates a relation to a conditional branch instruction to said main storage for reading.

3. An information processing system according to claim 1 wherein said address sending means includes means for cancelling addresses related to an instruction stream that is not to be processed among said addresses identified by both said specified stream number and said identification.

4. An information processing system according to claim 1 wherein said identification is a flag annexed to said read addresses stored in said address holding means.

5. An information processing system according to claim 2, said address sending means further including means for cancelling addresses related to stream numbers not to be processed except stream numbers outputted in response to said result of resting for a condition of a conditional branch instruction.

6. An information processing system according to claim 2, wherein said identification is a flag annexed to said read addresses stored in said address holding means.

* * * * *